United States Patent [19]

Wolf et al.

[11] 3,907,116

[45] Sept. 23, 1975

[54] CASSETTE RACK

[75] Inventors: Irving W. Wolf, Palo Alto; William E. Carpenter, Half Moon Bay, both of Calif.

[73] Assignee: Ampex Corporation, Redwood City, Calif.

[22] Filed: June 4, 1973

[21] Appl. No.: 366,726

[52] U.S. Cl. .................. 211/40; 206/387; 211/133; 211/134

[51] Int. Cl.² ........................................... A47G 29/00

[58] Field of Search ......... 211/40, 41, 49 R, 71, 72, 211/94.5, 133, 134, 162, 126, 1 A, 9 D; 312/350, 10, 11, 12; 108/109, 110; 206/DIG. 36, 309, 387

[56] References Cited

UNITED STATES PATENTS

| | | | |
|---|---|---|---|
| 749,291 | 1/1904 | Hilks | 211/134 X |
| 1,255,894 | 2/1918 | Krueger | 312/12 |
| 1,572,454 | 9/1926 | Vastola | 312/10 |
| 1,688,224 | 10/1928 | Bell | 312/10 |
| 2,291,547 | 7/1942 | Giffard | 211/134 X |
| 2,322,748 | 6/1943 | Shaw et al. | 211/126 X |
| 3,220,557 | 11/1965 | Brandes | 211/40 |
| 3,495,716 | 2/1970 | Gregory | 211/40 X |
| 3,561,004 | 2/1971 | Kozu et al | 206/DIG. 36 X |
| 3,565,282 | 2/1971 | Staar | 206/DIG. 36 X |
| 3,635,350 | 1/1972 | Wolf | 211/40 |
| 3,655,063 | 4/1972 | Landry | 211/71 |
| 3,698,782 | 10/1972 | Onori | 312/350 |
| 3,710,900 | 1/1973 | Fink | 206/387 X |
| 3,756,383 | 9/1973 | Kryter | 206/DIG. 36 X |

FOREIGN PATENTS OR APPLICATIONS

| | | | |
|---|---|---|---|
| 1,255,724 | 1/1961 | France | 211/40 |

*Primary Examiner*—Francis K. Zugel
*Assistant Examiner*—Thomas J. Holko

[57] ABSTRACT

A holder for both boxed and unboxed magnetic tape cassettes is formed as a rack with shelves sloping down and rearwardly for supporting the ends of the boxed cassettes, and the shelves are cut away to define nesting recesses to hold the smaller unboxed cassettes with the fronts thereof in the same vertical plane as the fronts of the boxed cassettes.

2 Claims, 1 Drawing Figure

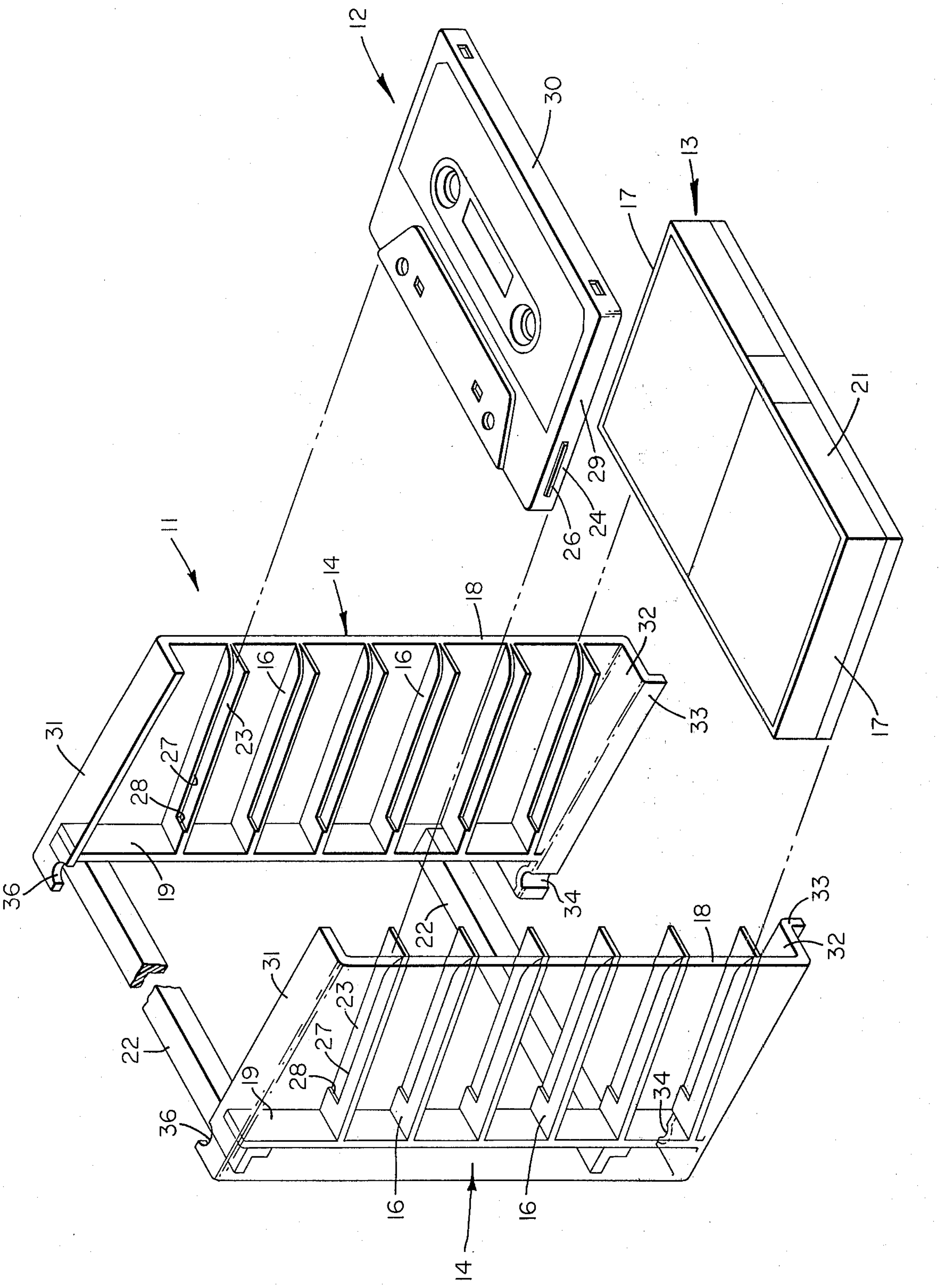
12
30
13
17
21
29
24
26
11
14
18
32
16
33
23
31
27
28
19
36
34
22

CASSETTE RACK

BACKGROUND OF THE INVENTION

This invention relates to rack-like holders, particularly for magnetic tape cassettes both boxed and unboxed.

Previously in the art there have existed types of carrying cases, racks and storage devices for magnetic tape cassettes of the industry standard "Philips" class. Various of these holders dispose the unboxed cassette in various arrangements to display a label on e.g. the side opposite the operating tape run, or some other side. Various other of these holders are constructed to accommodate cassettes in individual dust covers or boxes, which because of their greater dimensions, require a shelf space too large for the unboxed cassettes, with the result that unboxed cassettes fit loosely and clumsily therein and sink too deeply into the shelf recesses for effective display of their labels.

Accordingly, it is an object of the invention to provide a cassette storage holder adapted to hold boxed and unboxed cassettes equally well and with full display of their labels.

It is a further object of the invention to provide a holder as above described and suitable for inexpensive manufacture as a give-away package for a group (e.g., six for a "six-pack") of boxed or unboxed cassettes in shrink-wrapped package form, the holder being later usable either alone or in nested arrangement with other holders of the same type, as a permanent storage rack.

DESCRIPTION OF THE DRAWING

The sole drawing FIGURE is a perspective view of the holder of the invention showing the placement of boxed and unboxed cassettes therein.

DETAILED DESCRIPTION OF THE INVENTION

Referring now to the drawing, there is shown a holder 11 suitable for storing and displaying a number of industry standard Philips-type magnetic tape cassettes 12, either alone or in protective boxes 13. The holder is constructed to accommodate the greater dimensions of the boxes 13, and has two spaced parallel rack side pieces 14 having integrally formed thereon a number of confronting shelves 16 for holding opposite ends 17 of boxes 13. Side walls 18 of the side pieces are spaced apart for a dimension slightly greater than the greatest dimension or length of box 13, i.e., the dimension between the ends 17 of the box; while the shelves 16 are vertically spaced apart, in the holder position illustrated, for a dimension slightly greater than the smallest dimension or thickness of the box 13. Thus the boxes may fit into the shelf recesses with reasonable snugness, when the holder is used as a retail sales packaging framework, e.g., in cooperation with a transparent plastic sheet wrapping, particularly of the well-known "shrink-wrap" type. The shelves 16 slope downwardly and rearwardly in the holder orientation illustrated, and each side piece 14 has a back wall 19 defining a backstop for retention of the boxes 13 on the shelves. The depth dimension of each side wall from the front of the holder to the back wall 19 is approximately the same as the width (depth) dimension of the box 13 so that the box is held with its front side 21 substantially in the plane of the front of the holder for best display of labels. The two side pieces 14 are held together by spacing bars 22 of L-cross section, preferably integrally formed with the side pieces as part of a plastic-molding manufacturing process.

To accommmodate the unboxed cassettes 12 when the holder is later used by the retail customer as a storage rack, the shelves 16 are cut away to define nesting recesses 23. The depth of each recess 23, in a direction parallel to the side wall 18 and back wall 19, here shown as the vertical dimension, is slightly less than the clearance space 24 below the typical guide and gripping protrusion 26 that is to be found on industry standard Philips-type cassettes 12, so that the protrusion 26 rides above the upper surface of the shelf, and the opposed walls 27 of the recesses 23 are spaced apart for the length dimension of the cassette 12 to guide the cassette in the region 24 below the protrusion. The dimension between the front of the shelf and the rear wall 28 of the recess 23 is approximately the same as the long dimension of the cassette end 29, i.e., the depth of the cassette, so that in shelved position the cassette is also held with its front surface 30 in the same vertical front plane of the rack and faces 21 of the boxes 13, if any, for best display of labels.

To provide structural strength and nesting ability as between two or more holders, the side pieces are also provided with top walls 31 and bottom walls 32. Each bottom wall 32 has a turned-down flange 33 adapted to fit within and between the top walls 31 of a holder disposed below. Each flange 33 also has a downwardly and outwardly protruding key portion 34 adapted to fit within a keyway cutout 36 formed in the top wall of the holder below. Thus the nesting holders are locked against relative movement in either of the two directions orthogonal to the vertical.

What has been described is a nesting holder for both boxed and unboxed magnetic tape cassettes formed as a rack with shelves sloping down and rearwardly for supporting the ends of the boxed cassettes, the shelves being cut away to define nesting recesses to hold the smaller unboxed cassettes with the fronts thereof in the same vertical plane as the fronts of the boxed cassettes.

What is claimed is:

1. A pair of holders each for boxed and unboxed magnetic tape cassettes comprising:
   - a pair of spaced parallel rack side pieces including confronting shelves for holding opposite ends of a number of said boxed cassettes in a stacked arrangement;
   - each of said shelves being spaced from the adjacent shelves for a dimension greater than the thickness of one of said boxed cassettes;
   - said holder also including back wall portions for aligning said boxed cassettes with the fronts thereof in the same vertical plane;
   - said shelves being cut away on the upper portions thereof to define nesting recesses for holding opposite ends of said unboxed cassettes in said stacked arrangement when desired;
   - said nesting recesses being each in part defined by a forwardly and upwardly facing rear face at a dimension from the front of said holder such that said unboxed cassettes are held with the fronts thereof in the same vertical plane as the fronts of said boxed cassettes when the latter are engaging said back wall portions;
   - spacing means extending between said side pieces for securing said pieces in said spaced parallel condition;

said side pieces being formed with a pair of parallel planar side walls, and said back wall portions being formed as flanges integral with said side walls and extending toward one another to prevent rearward sliding of at least said boxed cassettes off said shelves at the back portion thereof;

each of said side pieces having a pair of top walls and a pair of bottom walls formed as flanges integral with said side walls and said back wall portions and each of said top and bottom wall pairs extending toward one another so as to present confronting sides and edges, respectively;

each of said holders having corresponding identical key protrusions and keyway cutouts disposed for mating with the keyway cutouts and key protrusions of the other holder, for locking said holders together in an assembly configuration;

said keyway cutouts and key protrusions being in said top and bottom walls, particularly for locking said holders against relative horizontal movement in a vertically stacked assembly configuration; and said protrusions for each holder including downwardly turned flanges formed at the confronting edges of said bottom walls, said last-named flanges being adapted for fitting between and snugly against the confronting sides of the top walls of the other holder when said other holder is stacked therebelow.

2. A pair of holders as described in claim 1, wherein said protrusions for each holder include a pair of downwardly and outwardly turned key portions formed on said bottom walls and adapted to fit within corresponding keyway cutouts formed in the top walls of the other holder, when said other holder is stacked therebelow.

* * * * *